United States Patent
Frazer et al.

(10) Patent No.: US 7,050,407 B1
(45) Date of Patent: May 23, 2006

(54) COMMUNICATION STRUCTURE WITH CHANNELS CONFIGURED RESPONSIVE TO RECEPTION QUALITY

(75) Inventors: Mark J. Frazer, Toronto (CA); Frank M. van Heeswyk, Toronto (CA); Frank Kschischang, Toronto (CA); Ramesh Mantha, Toronto (CA); W. Martin Snelgrove, Toronto (CA)

(73) Assignee: SOMA Networks, Inc., San Francisco, CA (US)

( * ) Notice: Subject to any disclaimer, the term of this patent is extended or adjusted under 35 U.S.C. 154(b) by 907 days.

(21) Appl. No.: 09/722,570

(22) Filed: Nov. 28, 2000

(30) Foreign Application Priority Data

May 30, 2000 (CA) .................................... 2310188

(51) Int. Cl.
*H04Q 7/00* (2006.01)
(52) U.S. Cl. ...................... 370/329; 370/336; 370/389; 370/474; 455/452.2; 455/513
(58) Field of Classification Search ................ 370/332, 370/342, 347, 335, 329, 338, 328, 465, 336, 370/474, 389; 455/513, 444, 446, 449, 452.2
See application file for complete search history.

(56) References Cited

U.S. PATENT DOCUMENTS

| 5,490,087 A | 2/1996 | Redden et al. |
| 5,568,483 A | 10/1996 | Padovani et al. ............. 370/84 |

(Continued)

FOREIGN PATENT DOCUMENTS

| EP | 0 831 669 AW | 3/1998 |

(Continued)

OTHER PUBLICATIONS

"Microcellular Personal Multimedia Communications System with Connectionless Communication Capability"—Publication Date: Apr. 5, 1997, 47th. Vehicular Technology Conference, Phoenix, IEEE, vol. 3 Conf. 47, May 4-7, 1997, pp. 1972-1976, XP000738708.

(Continued)

*Primary Examiner*—Ricky Q. Ngo
*Assistant Examiner*—Nittaya Juntima
(74) *Attorney, Agent, or Firm*—Katten Muchin Rosenman L.L.P.

(57) ABSTRACT

A communication structure and method which allows connection-like and connectionless communications to be provided on a multiplexed link is provided. The structure and method can make efficient use of available transmission capacity and/or network resources while providing for both types of communication. Connection-like communications can be provided by a channel having allocated bandwidth dedicated to the communication while connectionless communication can be provided by a shared channel through which data can be transmitted to subscribers. In an embodiment, the shared channel transmits frames of packets addressed to one or more of the subscribers. The frames can have a robustly packaged header that can be received by all subscriber stations serviced by the base station while payload data in the frame can be packaged with a level of robustness appropriate for the intended subscriber station. Different packagings can include different encoding and/or modulation of the payload data. The allocation of bandwidth between the dedicated channels and the broadcast channel can be fixed, or can be managed to meet network or network operator requirements. The structure and method can also be managed by the network operator to permit prioritization of some communications over others. In another embodiment, two or more shared channels are provided. In another embodiment, dedicated channels can be created with different amounts of bandwidth and/or can employ modulation and/or encoding selected according to the reception-quality of the recipient subscriber station.

13 Claims, 7 Drawing Sheets

U.S. PATENT DOCUMENTS

| | | | |
|---|---|---|---|
| 5,625,627 A * | 4/1997 | Ishi | 370/347 |
| 5,657,317 A | 8/1997 | Mahany et al. | |
| 5,859,840 A | 1/1999 | Tiedemann, Jr. et al. | |
| 5,930,230 A | 7/1999 | Odenwalder et al. | 370/208 |
| 5,949,814 A | 9/1999 | Odenwalder et al. | 375/200 |
| 6,154,450 A * | 11/2000 | Wallentin et al. | 370/311 |
| 6,370,383 B1 * | 4/2002 | Leatham et al. | 455/446 |
| 6,407,993 B1 * | 6/2002 | Moulsley | 370/347 |
| 6,553,540 B1 * | 4/2003 | Schramm et al. | 714/790 |
| 6,646,995 B1 * | 11/2003 | Le Strat et al. | 370/252 |
| 6,769,086 B1 * | 7/2004 | Western et al. | 714/751 |
| 6,771,660 B1 * | 8/2004 | Bourlas et al. | 370/466 |

FOREIGN PATENT DOCUMENTS

| | | |
|---|---|---|
| GB | 2 325 816 | 12/1998 |
| WO | WO 92/22162 | 12/1992 |
| WO | WO 98/19481 | 5/1998 |
| WO | WO 92/23844 | 5/1999 |
| WO | WO99/52307 | 10/1999 |

OTHER PUBLICATIONS

"A Bandwidth Efficient High Speed Wireless Data Service for Nomadic Users", Paul Bender, et al., CDMA/HDR.

* cited by examiner

COMMUNICATION STRUCTURE WITH CHANNELS CONFIGURED RESPONSIVE TO RECEPTION QUALITY

FIELD OF THE INVENTION

The present invention relates to a communication structure and method. More specifically, the present invention relates to a communication structure and method for transmitting data, which can include both voice data and non-voice data, over a multiplexed link, and which includes at least one channel that is configured responsive to reception quality.

BACKGROUND OF THE INVENTION

Many communications systems are known. Early communications systems were connection-based, in that a connection was physically established through the system between the communicating nodes. For example, in the early versions of the public switched telephone network (PSTN) users were provided a point-to-point connection to other users through switchboards, switches and trunks. More recently, the PSTN has employed multiplexed lines that are shared, through at least some part of the network, by multiple users, but which still provide a fixed amount of bandwidth and network capacity to each user for their connection, these bandwidth and network capacities being selected as meeting the anticipated maximum requirements for a common telephone voice conversation, typically referred to as toll quality.

Data communications systems have also been built which are connectionless. Connectionless systems generally operate on a best effort and/or statistical basis to deliver data via a suitable, but not necessarily fixed, route between the users, at best effort transmission rates and/or error rates. An example of a connectionless system is a packet network such as the Internet wherein the network capacity is shared amongst the users.

More recently, attempts have been made to combine connectionless and connection-like services on a single communication system. For example, much interest has been expressed recently in voice over IP (VoIP) through the Internet. However, it has proven difficult and/or costly to create a communication system which can meet both the connection-like requirements of VoIP (utilizing a moderate data rate and having some tolerance for errors, but requiring low latency) and connectionless data (often utilizing a high, bursty data rate and having a relatively high tolerance to latency but little tolerance for errors).

Attempts have been made to provide a connection-like mechanism via the Internet. One such attempt is the ReSerVaton Protocol (RSVP) proposed by some vendors and which allows network capacity to be "reserved" at routers and switches to establish a "virtual" connection through the Internet to better ensure that desired quality of service (QoS) levels will be met for the virtual connection. However, support for RSVP must explicitly be implemented within an application and at each switch and/or router involved in the virtual connection, which has been difficult to achieve to date. Further, there is a significant amount of time and overhead required to set up an RSVP connection which can negate the benefits or an RSVP connection for connections of relatively short duration. Even when implemented, RSVP does not typically result in an efficient usage of network capacity as the maximum anticipated bandwidth and/or network capacity requirements must be reserved for the duration of the connection, even if they are not used, or are not used continuously. Thus, in many circumstances, reserved network resources are sitting idle, or are under utilized, for some portion of time. Further, RSVP does not include any incentive mechanism by which applications/users are encouraged to only make effective use of network resources, i.e.—unreasonable requests for resources can be made by a user or application as there are no economic or other disincentives for doing so. RSVP does not allow a network operator to control the reservation of network resources, this is left up to end users.

Such difficulties are exacerbated when the links on which the network, or a portion of the network, is implemented involve a multiplexed link of expensive and/or limited bandwidth. In such cases efficient utilization of bandwidth and/or network resources is very important and RSVP or similar strategies have difficulty in meeting desired efficiencies. As used herein, the term multiplex and/or multiplexed link are intended to comprise any system or method by which a link is shared amongst users. Examples of such multiplexed links include wired or wireless links employing multiplexing systems such as TDMA, CDMA, FDMA or other arrangements. A specific prior art example of a communication system providing digital voice transmission over a multiple access wireless link is a PCS (Personal Communication System) cellular system. Such systems can employ a multiple access technique such as CDMA, GSM or other strategies to allow multiple callers to share the wireless link between the cellular base station and the PCS mobile units in both the upstream (mobile to base station) and downstream (base station to mobile) directions. One popular such system is the CDMA-based IS-95 cellular system in use in North America, South Korea and Japan.

While IS-95 based systems, or the like, have been very successful at handling voice communications, attempts to provide data services over such systems have experienced less success. To date, one approach has been that an assignable channel, from a limited set of such channels, must be dedicated to each user to which data is to be sent. This does not generally make efficient use of the available IS-95 bandwidth, as data rates and requirements vary much more widely than does a typical voice communication for which the channels were designed.

Other attempts have been made to offer data communication systems which address these problems and which are backward compatible with IS-95, but to date no system has been created which provides effective usage of available, limited, bandwidth on a multiple access link for data transmissions.

It is therefore desired to have a communication structure and method of providing data communications, including voice data, over wireless or other multiple access links.

SUMMARY OF THE INVENTION

It is an object of the present invention to provide a novel communication structure and method which includes at least one channel which is configured responsive to reception quality and which obviates or mitigates at least some of the above-identified disadvantages of the poor art.

According to a first aspect of the present invention, there is provided a communications structure for communicating between at least one network node and at least two subscriber stations through a multiple access link, said structure comprising:

a plurality of dedicated channels, each dedicated channel having allocated to it a portion of the transmission capacity of said link to provide communication between said network node and one of said at least two subscriber stations; and a shared channel having allocated to it a portion of the transmission capacity of said link and wherein said shared channel is operable to transmit frames of packets from said network node to said at least two subscriber stations.

According to another aspect of the present invention, there is provided a method of transmitting data from a network node to a plurality of subscriber stations over a multiple access link, comprising the steps of:

(i) determining the requirements for a first data transmission intended for a subscriber station;

(ii) selecting the use of a dedicated channel or a shared channel to effect said first data transmission in accordance with said determined requirements; and (iii) if a dedicated channel is selected, obtaining a dedicated channel when available and transmitting said first data transmission thereon and if a shared channel is selected, transmitting said first data transmission on said shared channel in the form of data packets addressed to said subscriber station.

According to another aspect of the present invention, there is provided a system for transmitting data comprising:

a network node having an output device for outputting a signal;

a plurality of subscriber stations each having an input device and being operable to a receive said signal at a different reception-quality than at least one other said subscriber station;

said signal including a frame having an identifier recoverable by all of said subscriber stations regardless of said reception-qualities, and a remaining portion recoverable by at least one of said subscriber stations, said identifier indicating whether said subscriber station need recover said remaining portion.

According to yet another aspect of the present invention, there is provided a communications structure for communicating between at least one network node and at least two subscriber stations through a multiple access link, said structure comprising:

a plurality of dedicated channels, each dedicated channel having allocated to it a portion of the transmission capacity of said link to provide communication between said network node and one of said at least two subscriber stations;

a shared channel having allocated to it a portion of the transmission capacity of said link and wherein said shared channel is operable to transmit frames of packets from said network node to said at least two subscriber stations; and wherein at least one of said dedicated channels or said shared channel employs a modulation and/or encoding method for transmissions to a subscriber station which is selected according to the reception-quality of said subscriber station, said modulation and/or encoding method differing from a modulation and/or encoding method for transmissions to another subscriber station with a different reception-quality.

According to yet another aspect of the present invention, there is provided a system for transmitting data comprising:

a base station;

a first subscriber station and being operable to a receive a transmitted radio signal from said base station at a first reception-quality;

at least one additional subscriber station operable to receive said transmitted radio signal at a second reception-quality different from said first reception-quality;

said base station operable to robustly-package a frame of data over a channel for reception by all of said subscriber stations, wherein a portion of said frame is recoverable by all of said subscriber stations to indicate whether a receiving subscriber station is intended to recover a remaining portion of said frame.

According to yet another aspect of the present invention, there is provided a subscriber station comprising:

means for receiving a radio-signal at a reception-quality, said radio-signal carrying a frame transmitted from a base station;

means to recover an identifier from said frame regardless of said reception-quality, said identifier indicating whether said subscriber station should recover a remaining portion of said frame that is packaged according to said reception-quality.

According to yet another aspect of the present invention, there is provided a frame for transmission to a plurality of subscriber stations each having a reception-quality corresponding to an ability to recover said transmission, said frame comprising:

an identifier packaged for recovery regardless of said reception-qualities and including information representing whether a receiving subscriber station is within a range of reception-qualities;

a header packaged for recovery by subscriber stations within said range and including address information; and, at least one payload packet packaged for recovery by subscriber stations in accordance with said address information.

According to yet another aspect of the present invention, there is provided a method of packaging a frame for transmission to at least one of a plurality of subscriber stations over a multiple-access link, each of said subscriber stations having a reception-quality associated with an ability to receive a transmission over said link, said method comprising the steps of:

receiving and buffering a sufficient amount of data to fill said frame;

assembling said data into at least one payload packet addressed to said at least one subscriber station, said at least one payload packet being robustly-packaged according said at least one subscriber station's reception-quality;

assembling an address of said at least one subscriber station into a header packet that is robustly-packaged at least according said at least one subscriber station's reception-quality;

assembling an identifier indicating the poorest reception-quality of the at least one subscriber stations having said at least one payload packet addressed thereto, said identifier being recoverable by all subscriber stations regardless of said reception-qualities;

assembling said payload packets, said header and said class-identifier into a frame; and transmitting said frame over said link.

According to yet another aspect of the present invention, there is provided a method of recovering a frame transmitted from a base station to a plurality of subscriber stations over a multiple-access link, each of said subscriber stations having a reception-quality associated with said multiple-access link, said method comprising the steps of:

receiving said transmitted frame;

recovering an identifier using a recovery operation corresponding to a lowest reception-quality of said subscriber stations;

recovering a header when said identifier indicates that said receiving subscriber station is within a range of reception-qualities, said header packet recovered using a recovery operation corresponding to a lowest reception-quality indicated by said identifier packet; and recovering payload packets when said header packets indicate that said payload packets are addressed to said receiving subscriber station, said payload packet recovered using a recovery operation corresponding to a reception-quality of said receiving subscriber station.

According to yet another aspect of the present invention, there is provided a frame for transmission to a plurality of subscriber stations each having a reception-quality corresponding to an ability to recover said transmission, said frame comprising:

an identifier packaged for recovery regardless of said reception-qualities and including information representing whether a receiving subscriber station is within a range of reception-qualities;

a header packaged for recovery by subscriber stations within said range and including address information; and at least one payload packet packaged for recovery by subscriber stations in accordance with said address information.

The present invention provides a communication structure and method to allow connection-like and connectionless communications to be provided on a multiplexed communication link. The structure and method can make efficient use of available transmission capacity and/or network resources while providing both types of communication and channels are configured corresponding to the reception quality of the intended subscriber stations. Connection-like communications can be provided by a dedicated channel having allocated transmission capacity dedicated to the communication while connectionless communication can be provided by a shared channel through which data can be transmitted to subscriber stations. Hybrid or other uses of the shared channel and dedicated channels can also be employed.

The allocation of transmission capacity between the dedicated channels and the shared channel can be fixed, or can be managed to meet network or network operator requirements. The structure and method can also be managed by the network operator to permit prioritization of some communications over others.

In an embodiment, the shared channel transmits frames of packets addressed to the subscriber stations.

In an embodiment, dedicated channels can have different amounts of transmission capacity allocated and they can employ different modulations and/or encoding methods to transmit data to the subscriber station they are allocated to corresponding to the reception quality of the subscriber station they are transmitting to.

Similarly, in an embodiment the shared channel can employ different modulations and/or encodings for packets or frames corresponding to the reception quality of the subscriber stations addressed by the packets.

In an embodiment two or more shared channels can be employed.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
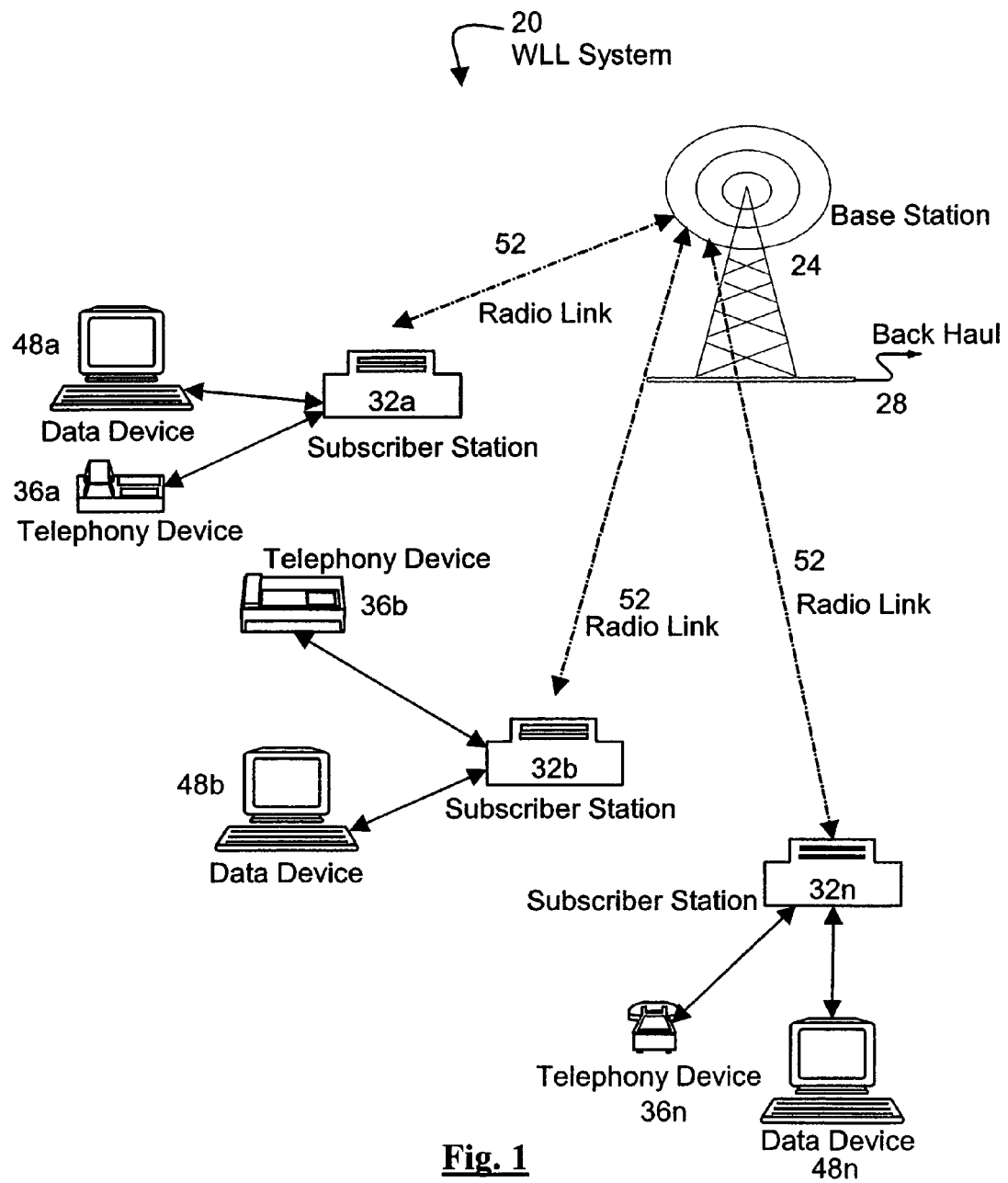
FIG. 1 shows a wireless local loop system employing a multiplexed radio link.

FIG. 1 shows a wireless local loop (WLL) system, indicated generally at 20. System 20 includes at least one network node, such as base station 24, which is connected to one or more networks, such as the PSTN and/or the Internet, and/or to one or more other base stations 24, via a back haul 28. Each base station 24 communicates with a plurality of subscriber stations 32 via a multiplexed radio link 52 shared between subscriber stations 32. In FIG. 1, each subscriber station 32 can provide simultaneous connections to at least one telephony device 36, such as a telephone set or facsimile machine, and a data device 48 such as a computer, video conferencing system, etc.

Radio link 52 employs a suitable multiplexing technique, such as TDMA, FDMA, CDMA, hybrids thereof or other multiplexing techniques to allow simultaneous use of radio link 52 by more than one subscriber station 32 and/or base station 24.

In prior art systems where, for example, subscriber stations are mobile telephones, a base station can assign the usage of a portion of a radio link to a subscriber station, on an as-needed basis. For example, in a system employing IS-95, the radio link is divided into a sixty-four channels in the forward link from the base station to the subscriber station. Some of these channels are dedicated for control and signaling purposes between the base station and subscriber stations, and the balance form a pool of traffic channels, one or more of which can be assigned as needed, to communicate with a subscriber station.

The IS-95 communication system suffers from certain disadvantages. For example, the channels are of fixed preselected data rate (e.g. 9.6 or 14.4 kilobits per second) and use of a traffic channel is reserved for the duration of the connection, even if the connection is not presently using the link resources (bandwidth and/or code space, etc.) allocated to the channel. It is not unusual that a voice conversation includes relatively long pauses wherein no information is transmitted and channel bandwidth is essentially wasted (although in CDMA, this results in a desirable reduction in interference between users).

When connectionless services are considered, this problem is much worse as transmissions to a data device, such as a computer, can comprise one or only a few packets that typically arrive in bursts, rather than at a steady rate. A channel established for such a connectionless service will therefore typically not use a large part of its allocated link resources, yet these unused resources are reserved for the duration of that connection and are unavailable for use elsewhere in the system until the channel is freed. In addition, there is a relatively significant overhead required to assign a channel between a base station and a subscriber station. Thus, for connectionless services between a base station and a subscriber station, the time and/or network processing requirements for establishing a channel can be unreasonable for short bursts of packets.

Figure 2:
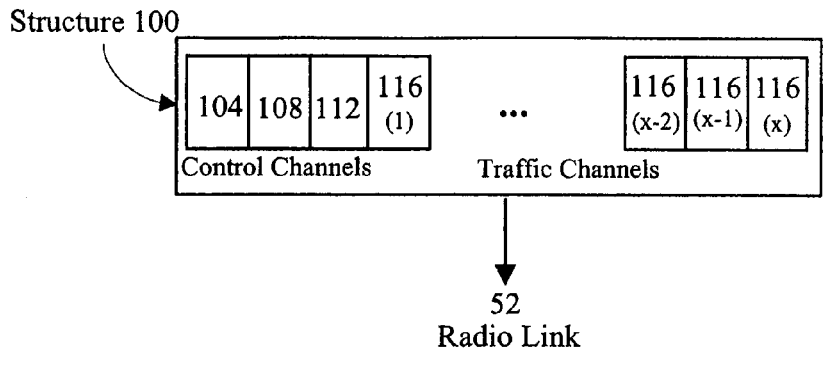
FIG. 2 shows a prior art communication system.

FIG. 2 shows a prior art downstream (from base station to users) structure 100 for the radio-link used in IS-95 CDMA systems. Structure 100 represents the bandwidth available which typically is arranged into as many as sixty-four channels. Channels 104, 108 and 112 are control channels used to establish and maintain communications with users. For example, channel 104 can be the IS-95 pilot channel, channel 108 the IS-95 paging channel and channel 112 the IS-95 synchronization channel. Additional or different fewer control channels can be employed that, for example, are transmitted to all (typically mobile) users. Channels $116_{(1)}$ through $116_{(x)}$ are the 'x' traffic channels which carry user (non-control) data between base station and the users. In IS-95A, traffic channels 116 all have the same data rate, while in IS-95B, the data rate of channels 104 through $116_{(x)}$ can be varied, resulting in different total numbers of channels. It is important to note that structure 100 is essentially part of a connection-based system, in that a traffic channel 116, and its associated resources, are allocated to a user for the duration of a communication and provide a fixed amount of bandwidth, and/or data rate, for the duration of the connection.

Figure 3:
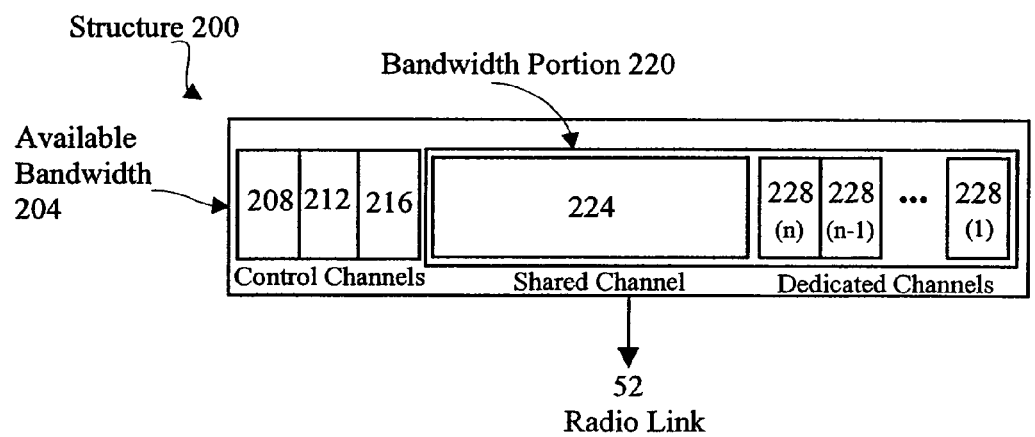
FIG. 3 shows a communication structure in accordance with an embodiment of the present invention.

FIG. 3 shows a structure 200 in accordance with an embodiment of the present invention which can be used, for example, as a downstream radio structure with WLL system 20 in FIG. 1. In structure 200, some portion of the available bandwidth 204 is allocated to one or more control channels (such as 208, 212 and 216) and the remaining portion 220 of bandwidth 204 is allocated between a shared channel 224 and 'n' dedicated channels, $228_{(1)}$ through $228_{(n)}$. As used herein, the term "bandwidth" is intended to comprise transmission capacity of a link. Depending upon the multiplexing technique employed on a link and the physical layer of the link, transmission capacity can be allocated to users as frequency bands, spreading code space, time slots or other link resources as will be apparent to those of skill in the art and the term bandwidth is intended to comprise all of these, as appropriate.

As described in more detail below, the bandwidth allocated to shared channel 224 can be increased and the number 'n' of dedicated channels 228 correspondingly decreased, or vice versa, as required.

Shared channel 224 is a multiplexed channel in that all subscriber stations 32 in FIG. 1 are capable of receiving data transmitted on it from base station 24 and shared channel 224 typically implements connectionless data transmissions to subscriber stations 32. One or more packets of data to be transmitted to a subscriber station 32 from base station 24 are assembled into a transmission frame, often along with packets addressed to other subscriber stations 32. These frames can be assembled at base station 24 from packets received via back haul 28 and/or from packets received at base station 24 from other subscriber stations 32 or can be assembled elsewhere and forwarded to base station 24 via backhaul 28. Each assembled frame is transmitted from base station 24 via shared channel 224 to subscriber stations 32 and each subscriber station 32 receives the transmitted frame and examines the packets therein to identify those, if any, which are addressed to it. Packets addressed to a subscriber station 32 are then processed accordingly by the addressed subscriber station 32.

In an embodiment of the present invention, a transmission frame is ten milliseconds in length and it is intended that the construction and transmission of frames is performed on an on going basis, with a frame being constructed and readied for transmission while the preceding frame is being transmitted.

In an embodiment of the present invention, shared channel 224 is operated such that packets addressed to different subscriber stations 32 can be transmitted with different modulation and/or encoding by base station 24 to make efficient use of bandwidth. Specifically, the ability of a subscriber station 32 to properly receive a signal transmitted to it, hereinafter referred to as the "reception-quality" of the signal, is determined. The determination of reception-quality is performed in different manners according to the multiplexing technique employed to transmit the signal. For example, in TDMA or FDMA systems, the received signal strength is the determination most often used. In CDMA systems, the ratio of received symbol energy to received interference energy (often expressed as $E_x/N_o$) is often the relevant determination. In any event, the reception-quality of channel 52 at each subscriber station 32, referred to generically as the signal to noise ratio (SNR) will vary depending on a variety of factors, including multipath interference (from the presence of nearby buildings, etc.), radio noise (including transmissions by other users or radio noise sources), geographical features, etc. and the distance of the subscriber station 32 from base station 24, as is well understood by those of skill in the art. With distance, typically a signal attenuates as $1/r^N$, where r is the distance between the subscriber station 32 and base station 24, and N>1. In IS-95 CDMA systems, for example, N typically is 3<N<5.

Figure 4:
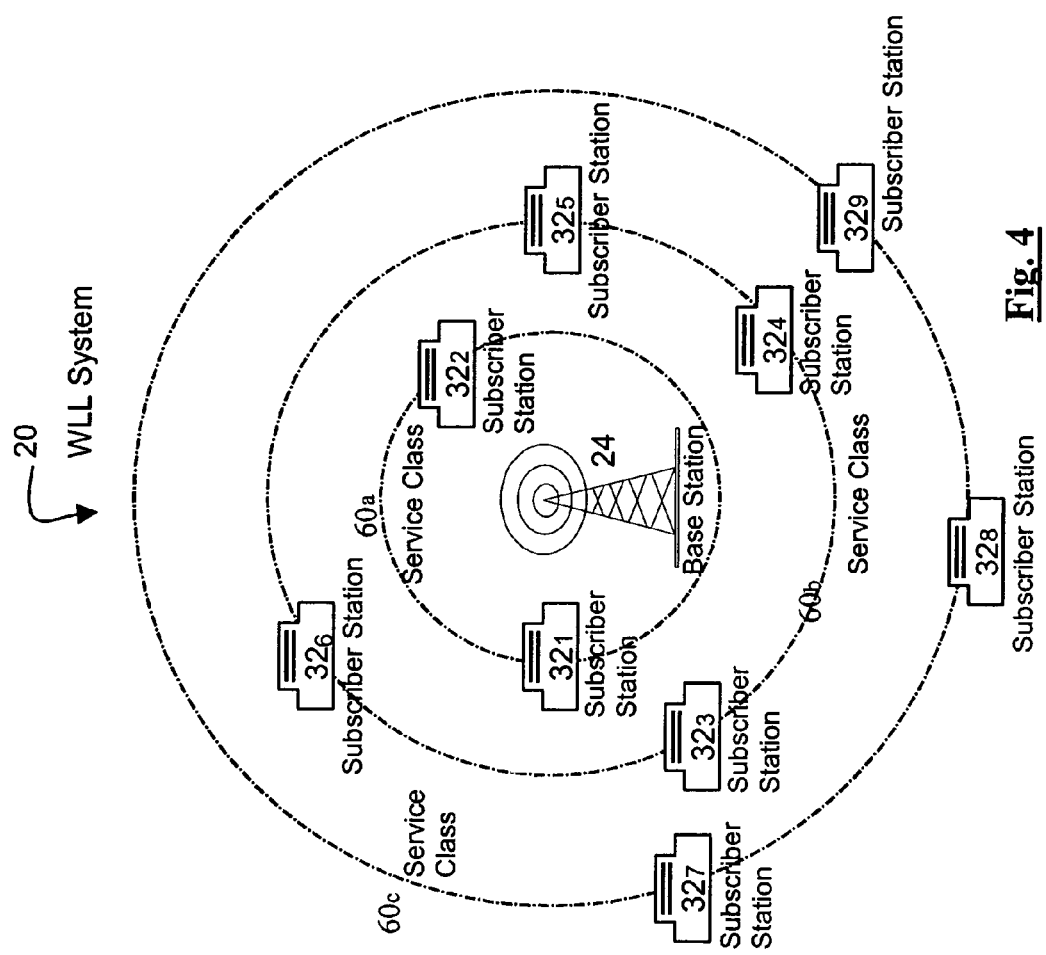
FIG. 4 shows a reception-quality service class arrangement in accordance with an embodiment of the present invention.

In FIG. 4, groups of reception-qualities experienced at subscriber stations 32 in WLL 20 are organized in service classes 60a, 60b and 60c, where each service class 60 corresponds to a predefined band of reception-qualities at subscriber stations 32. For example, service class 60a can include subscriber stations 32 with SNR's of 20 to 45 db for signals received from base station 24, while service class 60b can include subscriber stations 32 with SNR's of 10 to 20 db for signals received from base station 24 with SNR's of 0 to 10 db, etc. The actual ranges of SNR's included in a service class 60 can also be adjusted where the number of subscriber stations 32 in a service class 60 is too large or too small. For example, if service class 60b includes one hundred subscriber stations while service class 60a has only ten, the ranges of SNR's defined for service class 60a can be changed to 18 to 45 db and those for service class 60b to 10 to 18 db so that the number of subscriber stations 32 included in service class 60b is decreased to seventy while the number in service class 60a is increased to forty. This allows for improved latency control and network management in system 20.

In the Figure, service class 60a includes subscriber stations $32_1$, $32_2$ which have the highest reception-qualities in system 20 and service class 60b includes subscriber stations $32_3$, $32_4$, $32_5$ and $32_6$ which have the next-highest reception-qualities and service class 60c includes subscriber stations $32_7$, $32_8$ and $32_9$ which have the lowest reception qualities.

While service classes 60 and subscriber stations 32 are shown concentrically expanding about base station 24, as mentioned above the actual physical locations of subscriber stations 32 need not correspond to their distance from base station 24 and their positions in this Figure merely reflect their respective reception-qualities.

In any event, as illustrated in FIG. 4, subscriber station $32_8$ will receive shared channel 224 at a lower reception-quality than subscriber station 324, and subscriber station 324 will in turn receive shared channel 224 at a lower reception-quality than subscriber station 322, but at a better reception-quality than subscriber station $32_8$. As will be described below in more detail, data to be transmitted to a subscriber station 32 is packaged for transmission according to the service class 60 the subscriber station 32 is presently in.

It is contemplated that, in most actual implementations, each subscriber station 32 may transition between different service classes 60 at different times, depending on such factors as weather and/or local noise created by other electrical devices located proximal to the subscriber station 32. Accordingly, at appropriate intervals or predetermined events, each subscriber station 32 will report its present reception quality to base station 24. Base station 24 operates to maintain a database of the latest reported reception qualities and from time to time regroups subscriber stations 32 appropriately into service classes 60 according to the predefined range of reception qualities defined for each service class 60.

As used herein, the terms "package", "packaged" and "packaging" refer to the overall arrangement of the transmission of the packaged data for its reception at an intended destination. Packaging of data can include, without limitation, applying different levels of forward error correcting (FEC) codes (from no coding to high levels of coding and/or different coding methods), employing different transmissions rates, employing different modulation schemes (QPSK, QAM 4, QAM 16, QAM64, etc.) and any other techniques or methods for arranging data transmission with a selection of the amount of radio, or other physical layer, resources required, the data rate and probability of transmission errors which are appropriate for the transmission.

For example, a packet of data can be packaged with ¼ coding (i.e.—4 bi is are sent for each data bit) and QAM64 modulation for transmission to a first intended receiver and another packet can be packaged with ½ coding (i.e.—two bits arc sent for each data bit) and QAM256 modulation for transmission to a second intended receiver which has a better reception-quality than the first. In addition, different amounts of puncturing (removing some redundant coded bits) can be performed to yield a desired packaging.

Figure 5:
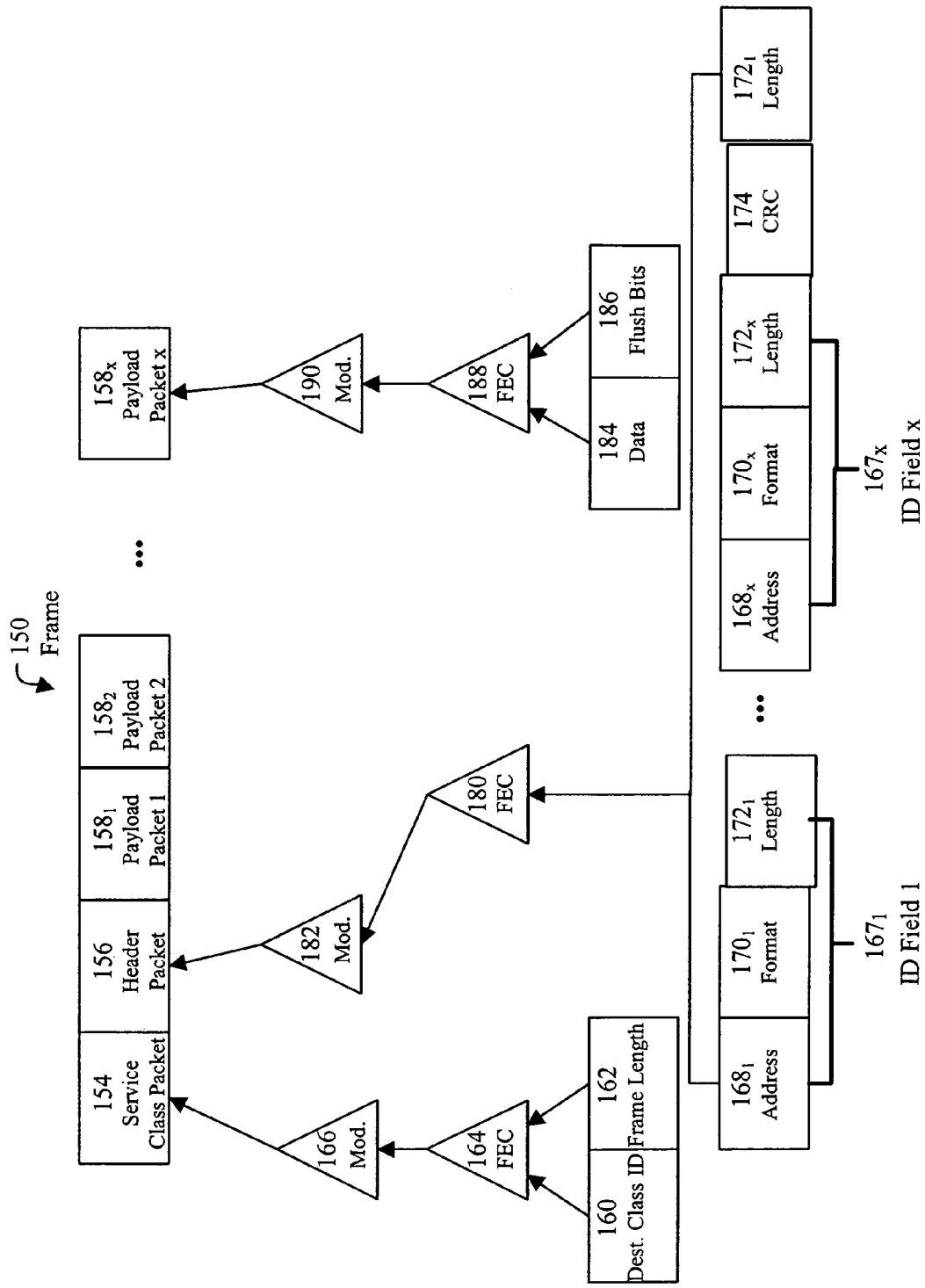
FIG. 5 shows a data frame for use with a shared channel and reception-quality service class structure in accordance with an embodiment of the present invention.

Referring now to FIG. 5, a frame for transmission over shared channel 224 is indicated generally at 150. In a presently preferred embodiment, frame 150 is constructed to require 10 milliseconds of transmission time, although longer or shorter transmission times for frame 150 can be selected if desired. As understood by those of skill in the art, frame 150 can be measured in terms of a duration of time and that duration can carry a given number of symbols for transmission to yield a bit rate. In turn, those symbols can represent data, the actual amount of data being represented by a symbol depending on how the data is packaged into a symbol, and data is packaged using a combination of modulation and encoding to yield an effective transmitted data rate. Thus, it will be appreciated that, while the bit rate for a frame can remain constant, the effective transmitted data rate of a frame will depend on the packaging of the data. For example, a transmission with a 9600 kilobit per second bit rate can yield effective data transmission rates of 4800, 2400 or less depending upon the amount of FEC coding, puncturing and/or the modulation technique applied. Further, as the modulation of packets within a frame can change, the effective data transmission rate can further vary. The application of these concepts to the present invention will be discussed in greater detail below.

Frame 150 includes a service class (or reception-quality) packet 154, a header packet 156 and a plurality of payload packets $158_1 \ldots 158_x$. As mentioned above, depending upon the packaging of payload packets 158, the quantity 'x' of payload packets 158 in frame 150 can vary, and the factors affecting this variation will be discussed in greater detail further below.

Service class packet 154 is composed or a destination-service class identifier field 160 and a frame-length field 162. It is presently preferred that destination-service class field 160 is about two bits in length (allowing four service classes to be defined) and frame-length field 162 is ten bits in length. Destination-service class field 160 identifies the outermost service class 60 (the service class with the lowest reception-quality from base station 24) for which a frame 150 contains at least one payload packet 158 destined for a subscriber station 32 resident in that outermost service class. For example, a frame 150 with a destination-service class identifier field 160 corresponding to service class 60b can include payload packets for subscriber stations 323, 324, 325 or $32_6$, or for $32_1$, or $32_2$, but not for $32_7$, $32_8$ or $32_9$. Frame length field 162 contains the value 'x', to indicate the number of payload packets $158_1, 158_2 \ldots 158_x$ in frame 150.

Unlike payload packets 158, destination service class field 160 and frame-length field 162 are always packaged into service class packet 154 in a robust manner to ensure a very high probability of recovery by all subscriber stations $32_1 \ldots 32_n$ when frame 150 is transmitted over shared channel 224. Such robust packaging is intended to allow every subscriber station 32 served by base station 24 to recover fields 160 and 162. In the present embodiment, the robustness of service class packet 154 is achieved in the following manner: fields 160 and 162 undergo a forward error correction (PEC) operation 164 and then undergo a modulation operation 166 prior to their insertion into service class packet 154. The type of forward error correction operation 164 and modulation operation 166 are selected based on the needs of subscriber station $32_n$ (i.e.—the subscriber station 32 with the poorest reception-quality) located on the service class 60 indicated in destination service class packet 160.

For example, if shared channel 224 employs CDMA multiple access technology, it is presently preferred that where a subscriber station 32 has an $E_s/N_o$ level of 3 db, then a suitable forward error correction operation 164 will be rate ½ coding and modulation operation 166 will be 4-QAM (i.e.—QPSK). An appropriate combination of forward error correction operation 164 and modulation operation 166 will not only assist and/or assure the recovery of service class packet 154 by subscriber station $32_n$, but that the remaining subscriber stations 32 serviced by base station 24 can also recover service class packet 154. Suitable forward error correction operations 164 and modulation operations 166 for a given subscriber station $32_n$ having a given reception-quality can be determined in a variety of manners, including empirically, as will occur to those of skill in the art and these determined packaging arrangements can be stored in base station 24, or elsewhere in system 20, as appropriate. As will be apparent to those of skill in the art, in some circumstances lower modulation rates (e.g. QAM64 instead of QAM256)

can be employed with lower coding rates (¾ instead of ½) or vice versa and the present invention is not limited to any particular set of packagings.

Appendix I shows a table of a set of packagings which could be employed for frame 150 in a CDMA system according to various SNRs. Column 1, labeled Ec/No, is an SNR measurement that indicates the energy per chip per a given noise level as experienced by a given subscriber station 32. Column 2, labeled Spreading Factor, indicates the number of chips per symbol. Column 3, labeled Modulation Symbols, indicates the modulation operation (QAM4, QAM 16, QAM64 or QAM256) used in the packaging of the data. Column 4, labeled Coded Bits/Symbol, indicates the number of bits per symbol after undergoing the modulation operation of column 3. Column 5, labeled Code Rate, indicates the resulting information bit rate resulting from the coding operation, including the effects of any selected level of puncturing used in the packaging of the data. Column 6, labeled Symbol Repetition Factor, indicates the factor by which symbols are repeated, to further package the data for robust recovery. Column 7, labeled Bits/Symbol, indicates the effective number of bits per symbol. Column 8, labeled Bits/Frame, indicates the effective bits per frame assuming all bits in the frame are packaged according to the modulation rate, coding rate and using the symbol repetition factor shown in the same row and the frame having a ten millisecond duration. Column 9, labeled Eb/No, is an SNR measurement that indicates the Energy per symbol per a given noise level, for a $10^{-3}$ Packet Error Rate (assuming 500 bit packets) as experienced by a given subscriber station 28. Column 10, labeled Eb/No, is an SNR measurement that indicates the Energy per bit per a given noise level. It will be understood by those of skill in the art that columns 1, 9 and 10 hear a fixed relationship to each other.

Header packet 156 contains a plurality of identifier-fields $167_1 \ldots 167_x$, which contain identifying information about each payload packet $158_1, 158_2 \ldots 158_x$. In a present embodiment, identifier fields 167 include an address field 168, a format field 170 and a length field 172. Address field $168_x$ indicates which of the destination subscriber station $32_x$ is intended to receive the respective payload packet $158_x$. Format field $170_x$ indicates the modulation and/or encoding used to package the respective payload packet $158_x$, the details of which will be discussed in greater detail below. Length field $172_x$ indicates the length of the respective payload packet $158_x$. Header packet 156 also contains a CRC packet 174, which can be used by each subscriber station $32a, 32b \ldots 32n$ to determine whether it has correctly received header packet 156. Flush-bits 176 are added to complete the encoded sequence to the format required by the complementary decoding operation at the subscriber station 32.

It is presently preferred that each address-data field 168 is twelve bits in length, that each format-data field 170 is four bits in length, that each length-data field 172 is twelve bits in length, that CRC field 174 is eight bits in length, and that flush-bits 176 are eight bits in length. However, other lengths can be employed to suit particular requirements, as will occur to those of skill in the art.

Identifier-fields $167_1 \ldots 167_x$, CRC packet 174 and flush-bits 176 are packaged into header packet 156 in a suitably robust manner to ensure a high probability of recovery by all subscriber stations 32 that are located between base station 24 and the service class indicated in destination-service class field 160. In other words, if destination-service class field 160 indicates service class 60b, then the contents of header packet 156 are packaged for robust recovery by all subscriber stations 32 in service classes 60a and 60b, but stations $32_7, 32_8$ and $32_9$ in service class 60c may not be able to receive header packet 156.

In the present embodiment, the robust packaging of header packet 156 is achieved in the following manner: identifier fields 167, CRC packet 174 and flush-bits 176 undergo an encoding operation 180 and then undergo a modulation operation 182 to form header packet 156. The forward encoding operation 180 and modulation operation 182 are selected based on the reception-quality needed to recover header packet 156 by the subscriber stations located on the service class identified by destination-service class packet 1.60. It is presently preferred that encoding operation 180 is rate ⅓ convolutional encoding, and that modulation operation 182 is M-ary QAM, where M can be 4, 16, 64, etc. Suitable selections of encoding operations 180 and modulation operations 182 can be determined in a variety of manners, including empirically, as will occur to those of skill in the art.

Each payload packet 158 is composed of one or more data packets 184 and flush bits 186. Each payload packet 158 is destined for one or more subscriber stations 32 that lie between base station 24 and the service class specified in destination-service class packet 160 (inclusive). Data packets 184 can be any type of data received at base station 24. For example, data packets 184 can be TCP/IP packets, or segments or aggregation thereof, where it is desired to transmit IP packets to a subscriber station 32. Data packets 184 can be specifically addressed to a particular subscriber stations $32_a, 32_b \ldots 32_n$ each of which has its own unique address and/or one or more broadcast addresses, to address multiple subscriber stations 32, can be defined.

Data packets 184 can be of any length and data to be placed into data packets 184 can be aggregated or segmented, as need, to an appropriate size. Generally, a data packet 184 can include a portion of one, or one or more packets intended for a single subscriber station 32.

Flush bits 186, which in a present embodiment are eight bits in length, are added to the end of data packets 184 in order to complete the encoded sequence to the format required by the complementary decoding operation at the subscriber station 32.

Each data packet 184, and its corresponding set of flush bits 186, is packaged into a respective payload packet $158_1, 158_2 \ldots 158_x$. This packaging is performed in a robust manner, according to the formatting specified in the format field 170 respective to its payload packet 158. This packaging ensures a high probability of recovery by the destination subscriber station 32. As will be apparent to those of skill in the art, other subscriber stations 32 that have reception-qualities equal to or better than destination subscriber station 32, can also recover the payload packet 158, but in general, such recovery will not be performed, and appropriate security measures can be employed to prevent eavesdropping. For example, if a frame 150 includes a destination service class field 160 defining a transmission to service class 60b and includes a payload packet 158 destined for subscriber station $32_3$, then the payload packet 158 will packaged such that it is recoverable by subscriber stations $32_1$ through $32_6$.

The specific forward encoding operation 188 and modulation operation 190 are selected based on the reception-quality at the subscriber station 32 located on the service class 60 identified by the address-data field 168 corresponding to the payload packet 158. It is presently preferred that encoding operation 188 is 1/N convolutional encoding (where N>2) and that modulation operation 190 is "M-ary QAM" (where M=4, 16, 64, 128 or 256) but in any event, N and M are selected appropriately for the reception quality in the service class 60 indicated by format field 170.

It is contemplated that, overall, the encoding operation 188 and/or the modulation operation 190 and/or other robust packaging can be common or individually selected for each payload packet 158 in a single frame 150. For example, where there are a wide range of reception qualities for subscriber stations 32 within a particular service class 60, then a common modulation operation 190 can be used for each subscriber station 32 within that particular service class 60, but a different encoding operation 188 can be used to accommodate the range of reception qualities within the service class 60.

The selection of encoding operations 188 and/or modulation operations 190 and/or other robust packaging for each payload packet 158 within frame 150 can depend on the actual application and/or type of data being carried over shared channel 224. (As the application and/or type of data may have different requirements to achieve the required probability of packet error.) For example, a file transfer transmission using the file transfer protocol (ftp) has a low tolerance to errors compared to a voice over IP (VOIP) connection. Thus payload packets 158 transmitted to a first subscriber station $32_3$ in service class 60*b* can be encoded with ¼ convolutional coding while payload packets 158 sent to another subscriber station $32_6$ in service class 60*b*, but for a VOIP connection, can be coded with 1/2 convolutional coding.

As will be apparent to those of skill in the art, when an encoding operation 188 and modulation operation 190 are selected for a service class, for example service class 60*b*, payload packets 158 intended for subscriber stations 32 in higher service classes, (i.e.—service classes containing subscriber stations 32 with higher reception-quality levels— such as service class 60*a*), can also be included in frame 150 if desired, although such payload packets 158 intended for higher service classes 60 will be packaged with a superfluous level of robustness for their intended destination.

It is contemplated that the present invention can be particularly suitable for carrying conferencing data, either voice or video, as one or more payload packets 158 within a frame 150 can be addressed (by, for example, including addressing information that indicates all subscriber stations 32 within the cell that should recover the payload packet 158) for recovery by a plurality of subscriber stations 32 participating in the conference. In such a case, payload packets 158 can contain conferencing data and the corresponding address field 170 will contain a broadcast/multicast address appropriate to the intended destination subscriber stations. It will be now apparent that data can be robustly-packaged to obtain a high probability of recovery by subscriber stations at some intermediate level of reception-quality, allowing for some acceptable level of reception error of payload data 158 by subscriber stations having a lower level of reception-quality, but a high probability of recovery by subscriber stations at a higher level of reception-quality.

While the embodiments discussed herein are directed to certain exemplary implementations of the invention, it will be understood that combinations, sub-sets and variations of the embodiments are within the scope of the invention. For example, data packets 184 received via backhaul 56 or from other subscriber stations 32 can be buffered in base station 24 to organize 150 frames in any desired fashion, such as grouping packets into frames 150 intended for individual ones of service classes 60*a*, 60*b* or 60*c*.

Buffering of data packets 184 in base station 24 can also allow the selection of frame size (i.e. the amount of symbols within a frame of a given predetermined time-length), as the amount of modulation and/or encoding and/or forward error correction actually needed to assemble each packet in the frame can be selected as desired.

It is contemplated that various methods can be used to determine the format of robust packaging (i.e. modulation and/or encoding) used to package packets within frame 150. For example, each subscriber station 32 can report its reception-quality (either as an exact measurement or by indicating the service class 60 in which the subscriber station 32 is currently included) to base station 24. In turn, payload packets 158 can be packaged (i.e. encoded and/or modulated) according to a predetermined format, known to both base station 24 and subscriber stations 32, according to the reported reception-quality. In this manner, base station 24 need not provide format field 170 to each subscriber station 32, as the subscriber station 32 can simply decode the relevant payload packet 158 according to the predetermined format. In the foregoing scenario, it will thus be apparent that format fields 170 can be eliminated.

Alternatively, format fields 170 can be included within frame 150 which further incorporate at least a control-bit to indicate that the payload packet 158 addressed to a given subscriber station 32 is packaged according to a predetermined format based on a subscriber station's 32 reception-quality, or the control-bit can indicate that the payload packet 158 is packaged according to some other format, which is indicated in the following bits within the format field 170. For example, if the first bit of format field 170 is a "0", this can indicate that the payload packet is encoded with a predefined packaging for the last reported reception-quality of the subscriber station 32. In such a case, the length of format field 170 is one bit. If the first bit of format field 170 is a "1", then the remaining bits indicate that particular packaging employed for the payload packet 158.

It is also contemplated that format fields 170 can be eliminated, as the format of robust packaging can be determined by receiving subscriber stations 32 using "blind detection", i.e. a receiving subscriber station 32 can simply attempt to decode a payload packet 158 at various arrangements of demodulation and decoding until the data packets 158 are meaningfully recovered. Other combinations and variations for choosing and detecting the type of robust packaging will now be apparent to those of skill in the art.

Referring again to FIG. 3, it is intended that each subscriber station 32 will continuously listen for and receive shared channel 224 and thus the time and/or network overhead processing requirements which would otherwise be required to establish a connection to a subscriber station 32 is avoided after a subscriber station 32 is in a normal operating mode (achieved as part of the normal power-up of each subscriber station 32). In this manner, even small amounts of data (such as single packets) can be transferred from base station 24 to subscriber stations 32 in an efficient manner as no setup is specifically required for transmission of a packet to a subscriber station 32.

For connection-like services, such as voice communication or other services which have QoS requirements such as relatively low latency, a dedicated channel 228 can be established, as needed, between base station 24 and a subscriber station 32. Dedicated channels 228 can be similar to the traffic channels of IS-95 and have a fixed data rate, or they can be allocated to provide different data rates as desired to, for example, enable voice communication at different qualities, e.g. toll level quality versus CD-Audio level quality. In any case, dedicated channels 228 effectively dedicate link resources to provide connection-like service levels to a connection between base station 24 and a subscriber station 32. It is also contemplated that hybrid connections can be established which employ both shared channel 224 and one or more dedicated channels 228. For example, a connection which has a relatively fixed normal data rate and requirements for low latency, but with infrequent bursts to a higher data rate, can be assigned a dedicated channel 228 sufficient for transmitting at the normal data rate and any bursts can be transmitted by shared channel 224. Alternatively, shared channel 224 can be used to implement both connection-like and connectionless services. In any event, the present invention is not limited to dedicated channels 228 providing connection-like services or shared channels 224 providing connection-less services and many suitable strategies for advantageously employing the structure of the present invention will occur to those of skill in the art.

In an embodiment of the present invention, one or more dedicated channels 228 can be allocated with different amounts of bandwidth and can employ different modulation and/or encoding schemes to improve the efficiency with which they use bandwidth. Much like the above described shared channel, in this embodiment a dedicated channel 228 can format and transmit data between base station 24 and a subscriber station 32 with modulation and encoding methods that selected according to the reception-quality of the subscriber station 32 to which the dedicated channel 228 is to be allocated.

If dedicated channels 228 are created with a fixed amount of bandwidth, then allocation of a dedicated channel 228 to a subscriber station 32 can be accomplished in a variety of manners, including the transmission of configuration information over one of control channels 208, 212, 216, etc. which informs the subscriber station 32 of the modulation and/or encoding to be employed on the dedicated channel 228. An alternative method of allocating a dedicated channel 228 to a subscriber station 32 is by transmission of a robustly packaged initialization message from base station 24 to the subscriber station 32 which informs the subscriber station 32 of the modulation and/or encoding to be employed on subsequent transmissions on the dedicated channel 228. In such as case, the robust packaging of the initialization message is pre-agreed for dedicated channels 228, so that subscriber station 32 can decode it.

If the dedicated channels 228 are created with variable amounts of bandwidth, then allocation is performed and subscriber station 32 informed via one or more of control channels 208, 212, 216, etc. of the setup details of channel 228 and then either of the above-mentioned methods, or any other suitable method as will occur to those of skill in the art, can be employed to establish the modulation and/or encoding used for the dedicated channel 228.

Figure 6A:
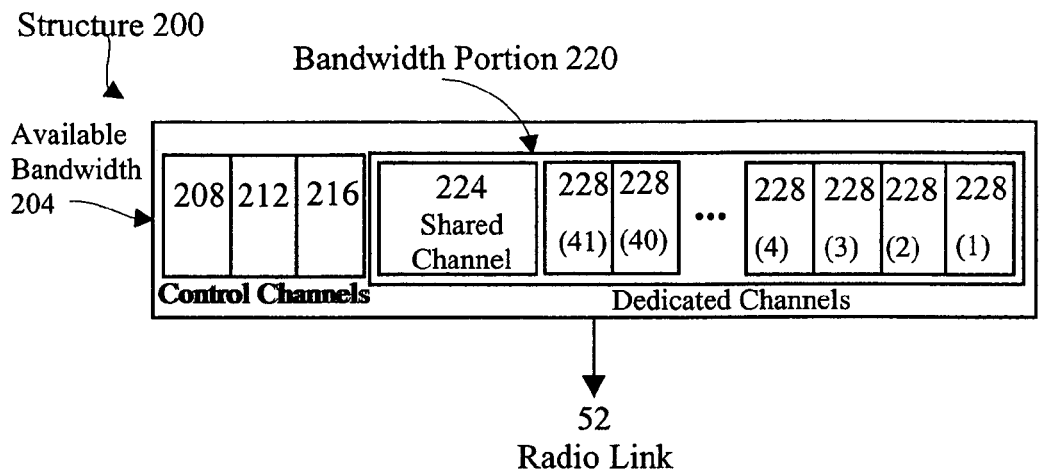
FIGS. 6*a* and 6*b* show the structure of FIG. 3 wherein the numbers of dedicated channels are changed to vary the allocation of bandwidth between a shared channel and dedicated channels.
Figure 6B:
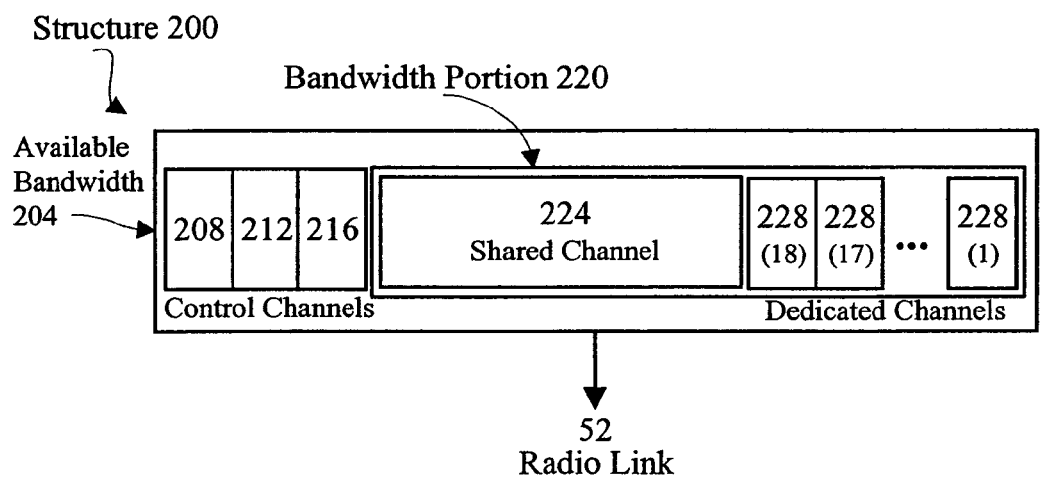

As mentioned above, bandwidth portion 220 is managed to allocate bandwidth between shared channel 224 and dedicated channels 228. For example, in FIG. 6a bandwidth portion 220, which could be enough bandwidth for fifty-four IS-95A traffic channels (fifty-four times ninety-six hundred kbps equals five-hundred and eighteen-point-four kbps), has been allocated to create forty-one dedicated channels 228 of ninety-six-hundred kbps (three-hundred and ninety-three-point-six kbps in total) and to allocate the balance of bandwidth portion 220 (one-hundred and twenty-four-point-eight kbps), to shared channel 224. In FIG. 6b, only eighteen dedicated channels 228 have been allocated (eighteen times ninety-six-hundred kbps equals one-hundred and seventy-two-point-eight kbps) and the balance (three-hundred and forty-five-point-six kbps) has been allocated to shared channel 224.

While structure 200 can be configured with a fixed amount of bandwidth allocated to shared channel 224 and remaining bandwidth allocated to a fixed number of dedicated channels 228, it is contemplated that bandwidth portion 220 will be actively managed in many circumstances. By actively managing the allocation of bandwidth portion 220 between shared channel 224 and dedicated channels 228, the operator of structure 200 can meet goals appropriate to the needs of their users and/or make efficient use of the bandwidth available to them. For example, an operator can decide to prioritize providing dedicated channels 228 for voice communications over providing higher data rates on shared channel 224.

It is contemplated that in managing bandwidth portion 220, a minimum bandwidth allocation will be selected for shared channel 224, for example bandwidth equivalent to a data rate of fifty kbps. This minimum allocation can be selected by an operator according to the service commitments shared channel 224 must meet and the number of subscriber stations 32 that channel 224 must serve. Shared channel 224 is then always allocated at least this selected minimum amount of bandwidth.

It is further contemplated that bandwidth for a selected minimum number of dedicated channels 228, for example five, will also always be allocated. The remainder of bandwidth portion 220 will then be allocated to shared channel 224. When some portion of this remainder of bandwidth is subsequently required to create additional dedicated channels 228, the required bandwidth is de-allocated from shared channel 224 and allocated to the new dedicated channel(s) 228, provided that shared channel 224 is still allocated at least the selected minimum amount of bandwidth. Otherwise, the capacity of structure 200 is exceeded and the creation of further dedicated channels 228 is inhibited.

In addition to the selected minimum number of dedicated channels 228, it is contemplated that a pool of a selected number of dedicated channels 228 (a "channel pool") will be allocated in anticipation of future needs. The dedicated channels 228 in the channel pool are allocated bandwidth but are not initially assigned to any subscriber station 32. When a new dedicated channel 228 is required by a subscriber station 32, it is assigned one of the dedicated channels 228 in the channel pool, thus avoiding the delay resulting from the reallocation of bandwidth from shared channel 224 to create a new dedicated channel 228.

Assuming additional bandwidth can be reallocated from shared channel 224, then a replacement dedicated channel 228 will be created and placed in the channel pool. If bandwidth cannot be reallocated from shared channel 224, (because, for example, it is at the selected minimum bandwidth), then the channel pool is decreased in the number of channels until an occupied dedicated channel 228 can be freed-up and returned to the channel pool.

When the channel pool contains the selected number of dedicated channels 228, then bandwidth allocated to additional dedicated channels that are no longer required for subscriber use can be reallocated to shared channel 224. It is also contemplated that channel pool can be managed such that both a minimum and maximum number of channels can be specified for the pool, i.e.—the size of the pool can be as small as five channels, before replacement channels are added to the pool and as many as eight channels can be in the pool before bandwidth is reallocated to shared channel 224.

It is contemplated that a variety of other management strategies and/or refinements to the strategies mentioned above will occur to those of skill in the art. For example, no channel pool need be established if the overhead delay required to create a dedicated channel 228 can be tolerated.

Figure 7A:
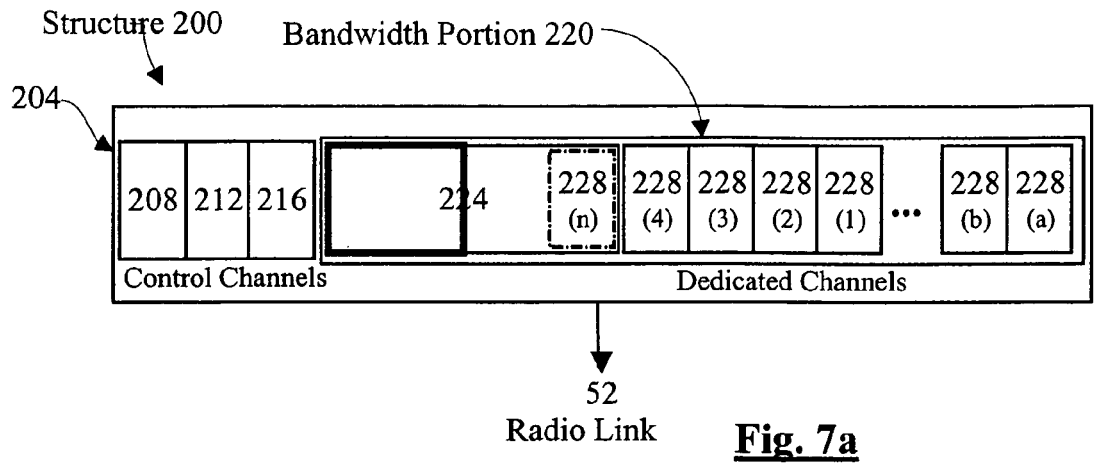
FIG. 7*a* shows an example of the structure of FIG. 3 wherein a minimum bandwidth allocation has been defined for the shared channel.

FIG. 7a shows a configuration of structure 200 wherein shared channel 224 has a defined minimum size (indicated in heavy solid line) but has been allocated additional bandwidth (as indicated in thin solid line). Further, in this configuration structure 200 has a channel pool of two dedicated channels $228_{(a)}$ and $228_{(b)}$ and Four dedicated channels $228_{(1)}$ through $228_{(4)}$ assigned to subscriber stations 32. As shown, if another channel $228_{(n)}$ is to be created, it will be allocated bandwidth from shared channel 224 which is resized accordingly.

Figure 7B:
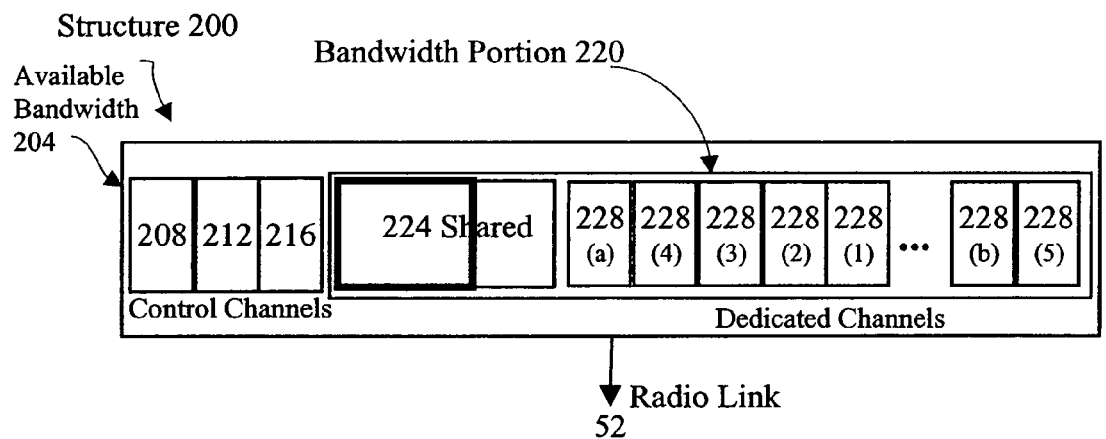
FIG. 7*b* shows the structure of FIG. 7*a* when an additional dedicated channel has been created and the bandwidth of the shared channel has been decreased accordingly.

As shown in FIG. 7b, when another dedicated channel 228 is required to be assigned to a subscriber, in addition to channels $228_{(1)}$ through $228_{(4)}$, channel $228_{(a)}$ (in this example) will be assigned as the required channel as channel $228_{(5)}$, a replacement dedicated channel $228_{(a)}$ will be created and placed in the channel pool to replace the assigned channel and the bandwidth allocated to shared channel 224 will be correspondingly decreased.

Figure 7C:
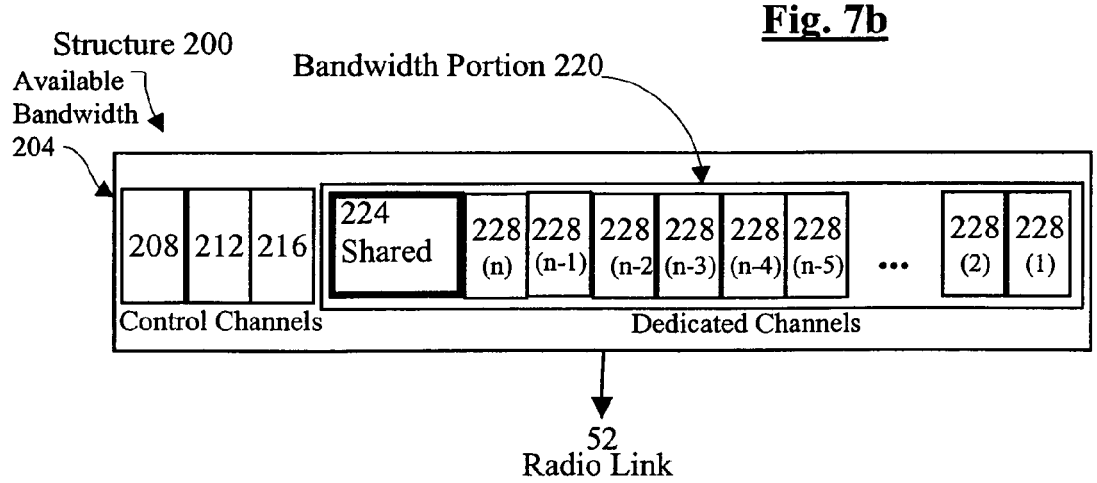
FIG. 7*c* shows the structure of FIG. 7*a* when the shared channel is reduced to its selected minimum level and the remainder of the bandwidth of the system has been allocated to assigned dedicated channels.

As the capacity of structure 200 is approached, and shared channel 224 is reduced to its defined minimum bandwidth, unused dedicated channels $228_{(a)}$ and $228_{(b)}$ (as channels $228_{(n)}$ and $228_{(n-1)}$ in the Figure) will be assigned to subscribers, as required, and no new dedicated channels 228 will be created, allowing the channel pool to become empty, as shown in FIG. 7c.

Figure 8:
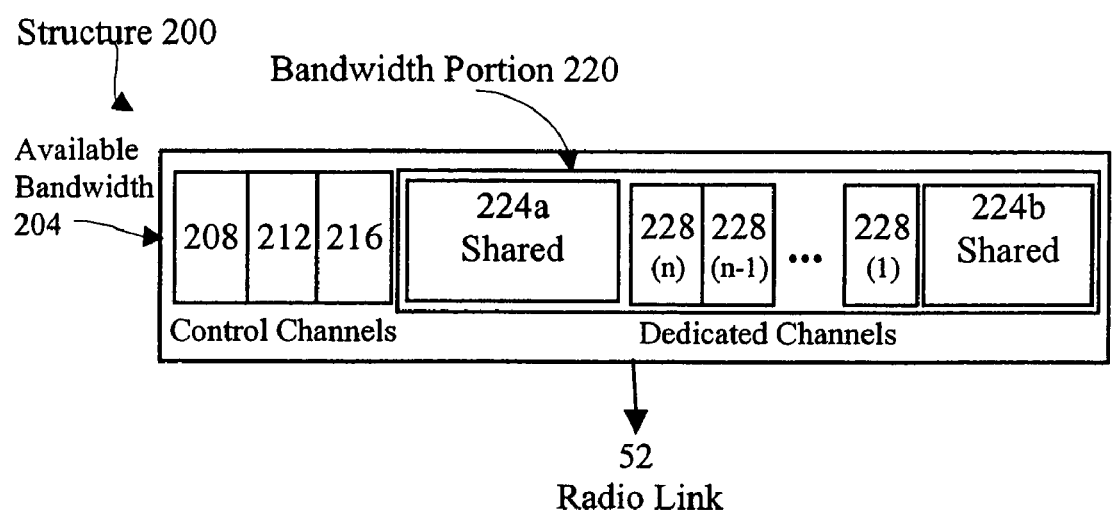
FIG. 8 shows the structure of FIG. 3 wherein two shared channels are provided.

It is also contemplated that more than one shared channel 224 can be provided, if desired, in bandwidth portion 220. In such a case, as shown in FIG. 8, each shared channel 224a and 224b will result in corresponding decreases in bandwidth available to dedicated channels 228 or other shared channels 224. As shown, broadcast channels 224a and 224b can have different amounts of bandwidth allocated to them. The allocation of bandwidth to shared channels 224 and dedicated channels 228 can be fixed, or can be managed. For example, either or both of shared channels 224a and 224b can have their allocated bandwidths increased, or decreased, accordingly as the number of dedicated channels 228 increases or decreases and/or as the bandwidth allocated to another shared channel 224 is increased or decreased.

One reason for providing more than one shared channel 224 can include the ability to reduce transmission latency by reducing the length of the transmission frames and/or allowing multiple frames to be sent at the same time. For example, one shared channel 224 can be dedicated to one group of service classes 60a and 60b, while a second channel can be dedicated to service class 60c. Another reason to employ more than one shared channel 224 is to provide an upgrade path whereby "old" subscriber stations 32 that cannot cope with an increased data rate or other new development can listen to one shared channel 224a which employs a suitable data rate or other needed technology and "new" subscriber stations 32 can listen to another shared channel 224b which employs an increased data rate or other new technology.

Another reason for including more than one shared channel 224 is for security. A group of subscriber stations 32 which are to receive secured communications will listen to an encrypted shared channel 224a, while the balance of subscriber stations 32 listen to a non-encrypted shared channel 224b. While packets on the non-encrypted shared channel 224b can have encrypted payloads, the entire frames of packets on the encrypted shared channel 224a can be encrypted, inhibiting traffic analysis to be performed on communications sent via channel 224a.

Yet another reason for providing more than one shared channel 224 can be that different subscriber stations 32 can have different abilities to receive the signals. Thus, one shared channel 224 can have modulation, encoding and/or power level suitable for a group of subscriber stations 32 which have good reception characteristics and a second shared channel 224 can employ a different modulation, encoding or power level suitable for another group of subscriber stations 32 which have poorer reception characteristics.

The present invention is not limited to radio links or to other links employing CDMA as a multiple access technique. For example, the present invention can be employed for certain links operating on wired network or optical network physical layers and employing multiplexing techniques such as TDMA, FDMA or hybrid multiplexing access techniques.

The present invention provides a communication system and method which allows connection-like and connectionless communications to be provided in a manner which can make efficient use of available bandwidth and/or network resources. The system and method can be managed by the operator of a network to permit prioritization of some communications over others and/or to vary bandwidth allocated between connection-like and connectionless communications as needed and/or desired.

The present invention provides a novel shared channel in a network having at least one base station and a plurality of subscriber stations. The shared channel can be composed of a plurality of frames having at least one packet that is readable by all subscriber stations which indicates whether the receiving subscriber station is an intended addressee for all or part of the frame. The frame and/or portions thereof are robustly packaged in any appropriate manner, to ensure and/or assist the intended addressee subscriber station(s) is capable of recovering any data addressed thereto, and that the unintended addressees subscriber stations arc capable of determining that they need not recover all or part of the data contained in the frame. By only robustly-packaging the frame, and/or portions thereof, according to different reception-quality requirements of different subscriber stations, less complex packaging and/or packaging with less redundancy can be used for stations that have better reception-qualities, thereby packaging more data into each frame, yet ensuring that the network is capable of reaching subscriber stations having lower reception-qualities by packaging the frame, or portions thereof, in a more robust (and complex) manner.

The above-described embodiments of the invention arc intended to be examples of the present invention and alterations and modifications may be effected thereto, by those of skill in the art, without departing from the scope of the invention which is defined solely by the claims appended hereto.

APPENDIX 1

| Ec/No (dB) | Spreading Factor (chips/symbol) | Modulation symbols | Coded bits/symbol | Code rate | Symbol Repetition Factor | Bit/symbol | Bits/frame | Ea/No for 10^-3 PER (dB) | Eb/No (dB) |
|---|---|---|---|---|---|---|---|---|---|
| −9.06 | 2 | 4 | 2 | 0.328 | 3 | 0.22 | 4198.4 | −6.05 | 0.55 |
| −8.81 | 2 | 4 | 2 | 0.357 | 3 | 0.24 | 4569.6 | −5.8 | 0.43 |
| −8.31 | 2 | 4 | 2 | 0.392 | 3 | 0.26 | 5017.6 | −5.3 | 0.53 |
| −7.56 | 2 | 4 | 2 | 0.435 | 3 | 0.29 | 5568 | −4.55 | 0.83 |
| −7.26 | 2 | 4 | 2 | 0.328 | 2 | 0.33 | 6297.6 | −4.25 | 0.59 |
| −7.01 | 2 | 4 | 2 | 0.357 | 2 | 0.36 | 6854.4 | −4 | 0.47 |
| −6.51 | 2 | 4 | 2 | 0.392 | 2 | 0.39 | 7526.4 | −3.5 | 0.57 |
| −5.76 | 2 | 4 | 2 | 0.435 | 2 | 0.44 | 8352 | −2.75 | 0.87 |
| −5.01 | 2 | 4 | 2 | 0.486 | 2 | 0.49 | 9369.6 | −2 | 1.12 |
| −4.51 | 2 | 4 | 2 | 0.556 | 2 | 0.56 | 10675.2 | −1.5 | 1.05 |
| −4.26 | 2 | 4 | 2 | 0.328 | 1 | 0.66 | 12595.2 | −1.25 | 0.58 |
| −4.01 | 2 | 4 | 2 | 0.357 | 1 | 0.71 | 13708.8 | −1 | 0.46 |
| −3.51 | 2 | 4 | 2 | 0.392 | 1 | 0.78 | 16052.8 | −0.5 | 0.56 |
| −2.76 | 2 | 4 | 2 | 0.435 | 1 | 0.87 | 16704 | 0.25 | 0.85 |
| −2.01 | 2 | 4 | 2 | 0.488 | 1 | 0.98 | 18739.2 | 1 | 1.11 |
| −1.51 | 2 | 4 | 2 | 0.556 | 1 | 1.11 | 21350.4 | 1.5 | 1.04 |
| −0.51 | 2 | 4 | 2 | 0.646 | 1 | 1.29 | 24806.4 | 2.5 | 1.39 |
| 1.49 | 2 | 4 | 2 | 0.770 | 1 | 1.54 | 29568 | 4.5 | 2.62 |
| 4.49 | 2 | 16 | 4 | 0.435 | 1 | 1.74 | 33408 | 7.5 | 5.09 |
| 4.99 | 2 | 16 | 4 | 0.486 | 1 | 1.95 | 37478.4 | 8 | 5.10 |
| 5.74 | 2 | 16 | 4 | 0.556 | 1 | 2.22 | 42700.8 | 8.75 | 5.28 |
| 6.99 | 2 | 16 | 4 | 0.646 | 1 | 2.58 | 49612.8 | 10 | 5.86 |
| 8.74 | 2 | 16 | 4 | 0.770 | 1 | 3.08 | 59136 | 11.75 | 6.86 |
| 12.99 | 2 | 64 | 6 | 0.646 | 1 | 3.88 | 74419.2 | 16 | 10.12 |
| 15.24 | 2 | 64 | 6 | 0.770 | 1 | 4.62 | 88704 | 18.25 | 11.60 |
| 16.99 | 2 | 256 | 8 | 0.556 | 1 | 4.45 | 85401.6 | 20 | 13.52 |
| 17.99 | 2 | 256 | 8 | 0.646 | 1 | 5.17 | 99225.6 | 21 | 13.87 |
| 20.49 | 2 | 256 | 8 | 0.770 | 1 | 6.16 | 118272 | 23.5 | 15.60 |

We claim:

1. A method of recovering a frame transmitted from a network node to a plurality of subscriber stations over a multiple-access link, each of said subscriber stations having a reception-quality associated with said multiple-access link, said method comprising the steps of:
receiving said transmitted frame at a subscriber station;
recovering an identifier from said transmitted frame using a recovery operation corresponding to a lowest reception-quality of said subscriber stations;
recovering a header from said transmitted frame when said identifier indicates that said receiving subscriber station is within a range of reception-qualities, said header recovered using a recovery operation corresponding to a lowest reception-quality indicated by said identifier; and
recovering payload packets when said header indicates that said payload packets are addressed to said receiving subscriber station, said payload packet recovered using a recovery operation corresponding to a reception-quality of said receiving subscriber station.

2. The method according to claim 1 wherein said identifier is packaged for recovery according to an error rate one order of magnitude lower than a target error rate for said frame.

3. The method according to claim 1 wherein said identifier is packaged into said frame using a modulation operation.

4. The method according to claim 1 wherein said identifier is packaged into said frame using an encoding operation.

5. The method according to claim 1 wherein said payload packets are packaged into said frame using a modulation operation.

6. The method according to claim 1 wherein said payload packets are packaged into said frame using a combination of an encoding operation and a modulation operation.

7. The method according to claim 6 wherein said encoding operation is rate 1/N convolutional encoding and N equals at least two.

8. The method according to claim 7 wherein the result of said encoding operation is punctured.

9. The method according to claim 6 wherein said modulation operation comprises M-ary QAM.

10. The method according to claim 1 wherein said payload packets are packaged into said frame using an encoding operation.

11. The method according to claim 1 wherein said frame is transmitted over a CDMA channel.

12. The method according to claim 1 wherein said reception-quality comprises a measurement of signal-to-noise ratio.

13. The method according to claim 1 wherein said transmitted frame is received over a shared channel that is allocated a portion of the transmission capacity of said multiple access link, another portion of the transmission capacity of said multiple access link being allocated to a plurality of dedicated channels, each dedicated channel providing communication between said network node and one of said plurality of subscriber stations, and wherein at least one of said dedicated channels and said shared channel employs a packaging method for transmissions to a subscriber station that is selected according to the reception-quality of that subscriber station, said packaging method differing from a packaging method employed for transmissions to another subscriber station having a different reception-quality.

* * * * *